US009852020B1

(12) United States Patent
Betz et al.

(10) Patent No.: US 9,852,020 B1
(45) Date of Patent: *Dec. 26, 2017

(54) MONITORING AND RESPONDING TO OPERATIONAL CONDITIONS OF A LOGICAL PARTITION FROM A SEPARATE LOGICAL PARTITION

(71) Applicant: International Business Machines Corporation, Armonk, NY (US)

(72) Inventors: John F. Betz, Red Hook, NY (US); Joel A. Bogart, Hyde Park, NY (US); Charles E. Haight, III, Poughquag, NY (US); Daniel G. Mackoway, Poughkeepsie, NY (US); Timothy W. Morrell, Staatsburg, NY (US); Thomas H. Rose, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,044

(22) Filed: Jan. 20, 2017

Related U.S. Application Data (63) Continuation of application No. 15/219,311, filed on Jul. 26, 2016, now Pat. No. 9,582,352.

(51) Int. Cl.
  *G06F 11/00* (2006.01)
  *G06F 11/07* (2006.01)
  (Continued)

(52) U.S. Cl.
  CPC .......... *G06F 11/079* (2013.01); *G06F 9/5077* (2013.01); *G06F 11/0712* (2013.01);
  (Continued)

(58) Field of Classification Search
  CPC ............... G06F 11/079; G06F 11/0712; G06F 11/0754; G06F 11/07; G06F 11/0703;
  (Continued)

(56) References Cited

U.S. PATENT DOCUMENTS

| 8,495,217 B2 | 7/2013 | Cyr et al. |
| 8,688,923 B2 | 4/2014 | Jacobs et al. |

(Continued)

FOREIGN PATENT DOCUMENTS

| EP | 2709013 A1 | 3/2014 |
| WO | 2011076567 A1 | 6/2011 |
| WO | 2015114816 A1 | 8/2015 |

OTHER PUBLICATIONS

Salapura et al., "ResillientVM: High Performance Virtual Machine Recovery in the Cloud", International Workshop on Automated Incident Management in Cloud (AIMC'15), in conjunction with EuroSYS'15-The European Conference on Computer Systems, Apr. 21 2015, Bordeaux, France, Copyright © 2015 ACM, pp. 7-12.

(Continued)

*Primary Examiner* — Bryce Bonzo
*Assistant Examiner* — Anthony J Amoroso
(74) *Attorney, Agent, or Firm* — Daniel R. Simek (57) ABSTRACT

Communicating with a logical partition of a computing system based on a separate logical partition in which each of one or more computing systems includes a central electronics complex (CEC) capable of concurrently operating multiple logical partitions, each CEC includes a support element (SE), in which the SE includes access to memory locations of each of the multiple logical partitions within memory of the CEC, and the SE has a mapping of the memory locations for each of the multiple logical partitions. A request to retrieve data from the memory of a logical partition with an operational condition is detected. The request is transferred (Continued)

to an SE interface which enables remote access to the logical partition with the operational condition, and in response to receiving the data, the data that includes the operations status from the memory location of the logical partition is displayed.

1 Claim, 4 Drawing Sheets (51) Int. Cl.
*G06F 11/34* (2006.01)
*G06F 11/30* (2006.01)
*G06F 11/32* (2006.01)
*G06F 9/50* (2006.01)

(52) U.S. Cl.
CPC ........ *G06F 11/0754* (2013.01); *G06F 11/301* (2013.01); *G06F 11/3086* (2013.01); *G06F 11/328* (2013.01); *G06F 11/3495* (2013.01)

(58) Field of Classification Search
CPC .............. G06F 11/0751; G06F 11/076; G06F 11/0766; G06F 11/0769; G06F 11/0775; G06F 11/0778; G06F 11/0784; G06F 11/30; G06F 11/3003; G06F 11/301; G06F 11/3024; G06F 11/3055; G06F 11/3058; G06F 11/3086; G06F 11/0793; G06F 11/2023; G06F 11/32; G06F 11/321; G06F 11/322; G06F 11/324; G06F 11/328; G06F 11/34; G06F 11/3409; G06F 11/3442; G06F 11/3452; G06F 11/3466; G06F 11/3476; G06F 11/3495; G06F 9/5077; G06F 9/45533; G06F 9/45537; G06F 9/45558; G06F 9/4401; G06F 9/50; G06F 9/5061; G06F 13/00; G06F 2009/45579; G06F 2009/45583; G06F 2009/45591; G06F 2009/45595; G06F 2009/45575; G06F 2201/81; G06F 2201/815; G06F 2201/865
See application file for complete search history.

(56) References Cited

U.S. PATENT DOCUMENTS

| | | |
|---|---|---|
| 8,880,934 B2 | 11/2014 | Rangaiah |
| 2012/0011391 A1 | 1/2012 | Callaway et al. |
| 2012/0222029 A1 | 8/2012 | Watanabe et al. |
| 2015/0040128 A1 | 2/2015 | Garza et al. |
| 2015/0301913 A1 | 10/2015 | Gomi et al. |
| 2016/0364297 A1 | 12/2016 | Lo et al. |
| 2016/0378603 A1 | 12/2016 | Herzi et al. |

OTHER PUBLICATIONS

Wyman et al., "Multiple-logicalchannel subsystems: Increasing zSeries I/O scalability and connectivity", IBM J. Res. & Dev., vol. 48, No. 3/4, May/Jul. 2004, © Copyright 2004 by International Business Machines Corporation, pp. 489-505.

Betz et al., "Monitoring and Responding to Operational Conditions of a Logical Partition From a Separate Logical Partition", U.S. Appl. No. 14/954,498, filed Nov. 30, 2015, 36 pages.

Betz et al., "Monitoring and Responding to Operational Conditions of a Logical Partition From a Separate Logical Partition", U.S. Appl. No. 15/219,311, filed Jul. 26, 2016, 36 pages.

IBM Appendix P, List of Patent Applications Treated as Related, Filed Herewith, 2 pages.

MONITORING AND RESPONDING TO OPERATIONAL CONDITIONS OF A LOGICAL PARTITION FROM A SEPARATE LOGICAL PARTITION

BACKGROUND

The present invention relates generally to the field of mainframe operating systems, and more particularly to access to unresponsive logical partition system components from a separate logical partition.

Contemporary mainframe computer systems are enabled to operate multiple concurrent logical partitions (LPARs), sometimes referred to as "images", which operate as a set of separate computers created by the virtual division of the mainframe computer's processors, memory, and storage into multiple sets of resources, such that each set of resources can be operated independently with its own operating system instance and its own set of running applications. In effect, a physical machine can be partitioned into multiple logical partitions, each hosting a separate instance of an operating system.

If the operational processing speed of an LPAR operating system (OS) becomes unacceptably slow or "bogged down", and the operating system user interface, or console, becomes unresponsive due to processing issues such as the lack of resources, serialization issues, or in general a "hang" condition, it may be difficult or impossible to determine the exact state of the unresponsive LPAR and view the system conditions to determine the nature and location of the problem(s). Without the ability to determine the nature and cause of problems, the system operator is unable to take action to resolve the problem. In such a situation it is possible that the LPAR OS may require an initial program load (IPL) action to correct the problem, which results in the loss of transaction state and data, without protective recovery activity.

SUMMARY

Embodiments of the present invention disclose a method, computer program product, and system for communicating with a logical partition of a computing system based on a separate logical partition. The method provides for one or more computing systems, each of the one or more computing systems includes a central electronics complex capable of concurrently operating multiple logical partitions, each central electronics complex includes a support element, in which the support element includes access to memory locations of each of the multiple logical partitions operating within memory of the central electronics complex that is associated with the support element, and the support element has access to a mapping of the memory locations for each of the multiple logical partitions of the central electronics complex. One or more processors of the central electronics complex receives a request to retrieve data that includes operational status from the memory locations of a logical partition of the multiple logical partitions in which an operational condition affecting performance is detected. One or more processors transfers the request to an interface for the support element, by one or more processors of the central electronics complex, in which the interface for the support element enables remote access of the unresponsive logical partition, and in response to receiving the data that includes the operational status from the memory locations of the logical partition of the multiple logical partitions in which the operational condition affecting performance is detected, one or more processors of the central electronics complex displays the data that includes the operational status from the memory location of the logical partition of the multiple logical partitions.

DETAILED DESCRIPTION

Embodiments of the present invention recognize that logical partitions (LPARs) of virtualized resources of a computer, such as a mainframe computer, operating independently from other LPARs, may become critically slow or unresponsive during operational processing of one or more application. An operator, such as the mainframe computer's system administrator, may be able to take corrective actions directed towards the unresponsive LPAR, or "target" LPAR, if diagnostic information regarding the target LPAR's resources were available and an operable path of communication were open to the target LPAR's OS.

Embodiments of the present invention provide a method, computer program product, and computer system for investigating, diagnosing, and responding to detected operational conditions of logical partitions (LPARs), such as unresponsive LPARs, also referred to as image failures. Some embodiments of the present invention provide a rescue or monitoring LPAR OS that can "look" into the unresponsive target LPAR memory, retrieving status and state data, without direct use of resources of the target LPAR. Other embodiments enable alternative communication pathways to take action to correct or mitigate conditions to resolve the problem causing an operational condition, such as an unresponsive target LPAR.

In embodiments of the present invention, two or more logical partition (LPAR) systems are involved, with one LPAR as the unresponsive, or "target" LPAR, and at least one other LPAR as a monitoring LPAR. The target LPAR includes the unresponsive operating system from which embodiments of the present invention discover and retrieve status and/or state data, and to which commands may be issued to further diagnose and/or resolve problems causing unresponsiveness, using an application that enables the use of an alternative communication pathway. The monitoring LPAR includes an operating system separate from that of the target LPAR, and application code (discussed herein as partition monitoring program 300) to enable an otherwise alternative pathway to submit requests to the support element (SE) of the central electronics complex (CEC) of the computer system, in whose system memory the target LPAR OS resides. The requests are submitted to extract status and/or state data from the target LPAR without requiring activity of the OS of the target LPAR. Embodiments of the present invention receive the data from the requests submitted to the SE of the target LPAR system, displaying data and condition information for analysis and, if necessary, enabling delivery of commands as requested by an operator of the monitoring LPAR system to resolve the condition(s) of the unresponsive, or problem demonstrating target LPAR system.

The target system may be any operating system for which the monitoring LPAR system has adequate information and structure to "understand" the underlying control block structure of the target LPAR. As such, the target LPAR could be a partition virtualized by zOS®, zVM®, Linux on system z, for example, or any operating system in which the above conditions are met for which monitoring and corrective action is deemed as necessary. Embodiments of the present invention may also operate on any underlying operating system, such as z/OS®, z/VM®, (z/OS and z/VM are registered trademarks of International Business Machines Inc. in the U.S. and other countries worldwide), Linux on system z, or other operating systems. The monitoring LPAR system has an independent OS, which is able to utilize the central electronic complex's (CEC's) support element (SE) to retrieve data and send functions to the target LPAR.

Some embodiments of the present invention provide an additional user interface, for display of retrieved data and submission of commands to the target LPAR OS. As such, the additional user interface may be similar to a common interface, or the operations interface that may currently exist for the target LPAR. Further, additional user interface panels may be included, such that the panels will emulate some or all of current user interfaces provided by debug-tools. By including the additional user interface panels, a system programmer may experience a continuity and familiarity in their use of displays and commands. Embodiments of the present invention display, on the additional user interface panels, the requested data that is descriptive of the status of the unresponsive LPAR, which are retrieved from the target system using commands issued to the CEC's support element (SE) of the target LPAR.

Embodiments of the present invention utilize the CEC support element (SE) to request and obtain data associated with the target LPAR, and to provide a command pathway to insert alterations to the target LPAR operating system towards resolving unresponsive problems. In some embodiments, if the SE provides remote application interfaces, then a partition monitoring program need not reside on the CEC that includes the target LPAR, which can be useful in monitoring multiple operating system images on multiple CECs. In other embodiments, in which remote application interfaces are not available, or not used, the partition monitoring program will reside on the same CEC that the target LPAR resides.

Figure 1:
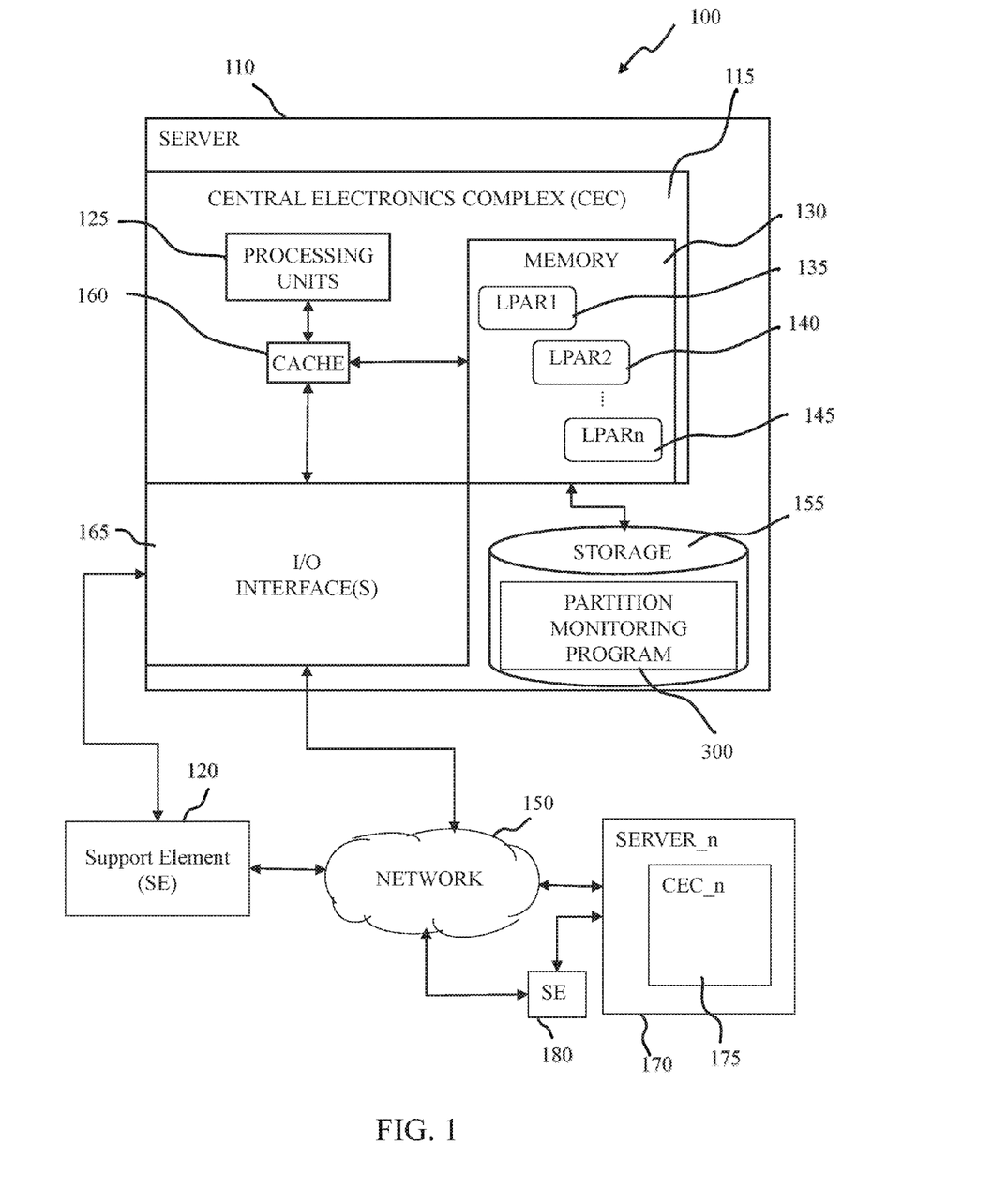
FIG. 1 is a functional block diagram illustrating a distributed computer processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. Distributed computer processing environment 100 includes support element 120, server 110, which is shown to include central electronics complex (CEC) 115, processing units 125, memory 130, LPAR1 135, LPAR2 140, LPARn 145, storage 155, cache 160, and I/O interfaces 165, which connects server 110 to network 150.

Network 150 can include one or more wired and/or wireless networks that are capable of receiving and transmitting data, voice, and/or video signals, including multimedia signals that include voice, data, and video information. Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between CEC 115 of server 110, SE 120, partition monitoring program 300, and other computing devices, systems and components (not shown) accessible to server 110, in accordance with embodiments of the present invention.

Server 110 is a computing device that includes CEC 115, I/O interfaces 165, and storage 155, shown storing partition monitoring program 300. In some embodiments server 110 may be a mainframe computer, capable of hosting multiple virtualized computing systems as logical partitions of server 110's memory and other resources. Server 110 may be any computing system capable of receiving and sending data, hosting multiple LPARs, and including at least one support element, or its equivalent, which has an operating system independent from that of server 110, and the support element has access to memory and status of server 110 LPARs. In other embodiments, server 110 may represent a computing system utilizing multiple computers as a virtual server system, such as in a cloud computing environment. In another embodiment, server 110 may be a laptop computer, a tablet computer, a netbook computer, a personal computer (PC), a desktop computer, a personal digital assistant (PDA), a smart phone, or any programmable electronic device capable of operating two or more LPARs and performing the operational steps of partition monitoring program 300. In another embodiment, server 110 represents a computing system utilizing clustered computers and components (e.g., database server computers, application server computers, etc.) that act as a single pool of seamless resources when accessed within distributed computer processing environment 100. Server 110 may include internal and external hardware components, as may be described below, and depicted and described with reference to FIG. 4.

Server_n 170 is shown as including CEC_n 175 and connected to SE 180. Server_n 170 is remote to server 110 and connected to server 110 and SE 120 via network 150. In some embodiments of the present invention, server_n 170 may be a mainframe computer, capable of hosting multiple virtualized computing systems as logical partitions of server_n 170's memory and other resources. Server_n 170 may be any computing system capable of receiving and sending data, hosting multiple LPARs, and connected to at least one support element, SE 180, or its equivalent. SE 180 has an operating system independent from that of server_n 170, and has access to the memory and status of LPARs of CEC_n 175 on server_n 170. In other embodiments, server_n 170 may represent a computing system utilizing multiple computers as a virtual server system, such as in a cloud computing environment. In another embodiment, server 170 may be a laptop computer, a tablet computer, a netbook computer, a personal computer (PC), a desktop computer, a personal digital assistant (PDA), a smart phone, or any programmable electronic device capable of creating and managing logical partitions, interacting with a support element or equivalent, such as SE 180, having an operating system independent of that of logical partitions (not shown) of CEC_n 175, and performing the operational steps of partition monitoring program 300. In another embodiment, server_n 170 represents a computing system utilizing clustered computers and components (e.g., database server computers, application server computers, etc.) that act as a single pool of seamless resources when accessed within distributed computer processing environment 100. Server_n 170 may include internal and external hardware components, as may be described below, and depicted and described with reference to FIG. 4.

CEC 115 is a central electronics complex component of server 110, and contains a set of hardware components that includes processing units (PU) 125, memory 130, cache 160, I/O interface(s) 165, and controllers, and power supplies, and channels interconnecting internal components of server 110 (not shown). CEC_n 175 is a central electronics complex for server_n 170, and includes hardware (not shown), similar to that shown and/or described in detail for CEC 115. CEC_n 170 is capable of operating a plurality of logical partitions, and is supported by support element (SE) 180, which has an OS independent of server_n 170.

SE 120 is a support element of central electronics complex, CEC 115, of server 110. Each central electronics complex (CEC) of a mainframe computing system has a corresponding support element (SE) which may be considered a component of the CEC, and has direct access to the resources allocated to LPARs operating within the CEC for that system. An SE is often used to set up or manage modifications of the processors of the CEC, and includes various access capabilities to the system resources, such as access to memory of the CEC, information identifying LPARs in operation, and memory and processing resources allocated to LPARs in operation. Having access capabilities to memory 130 of CEC 115, SE 120, in some embodiments of the present invention, is enabled by partition monitoring program 300 (discussed in detail below), to use alternative connection pathways to retrieve memory status and operational state of an unresponsive LPAR, or unhealthy condition of an LPAR of CEC 115, for example, LPAR2 140. Embodiments of the present invention make use of an SE, for example, SE 120, which includes information depicting the LPARs that are running, the location/structure of the LPARs in memory, and the processors used by each LPAR. SE 180 is a support element for CEC_n 170, and includes attributes and access ability similar to SE 120, described above, but applied to CEC_n 170.

The information included in the SE, or accessible to the SE, enables the SE to "understand" the control structure of the memory supporting LPARs currently running, including an unresponsive operating system of an LPAR. The OS of an LPAR allocates memory for the components under control of the OS, to store information used during operation, enabling the OS to manage itself and the resources the OS has allocated within that individual LPAR. For example, the z/OS®, has many components, such as a real storage manager, an I/O supervisor, a consoles component, and many others. Each component is allocated memory/storage to manage itself and activities of interaction with the operating system. The memory that is allocated is sometimes referred to as "structures" and the structures are assigned labels (at compiling, or by a compiler). For example, there is a common control block labeled a "CVT", (a vector table), which is a common control block that is frequently accessed and has a series of definitions providing information that in effect states, "at this memory location, at offset Zero from the control block, this particular field resides, and another field is located at position 10", and so on. Referring to the control block structure as being "understood" by the SE means that the mappings of these structures in the operating system have been obtained by examining the control blocks or reading-in the different information about the control blocks.

Memory 130 is the system memory of server 110, and is a component of CEC 115. As logical partitions are formed by server 110, each LPAR is allocated a portion of memory 130 as dedicated memory for the LPAR, such as LPAR1 135.

LPAR1 135, LPAR2 140, and LPARn 145 represent a series of logical partitions of memory 130, as virtualized by the OS of server 110. LPARn 145 represents the "nth" LPAR in memory 130, of CEC 115, of server 110, indicating that three or more LPARs exist, as an exemplary illustration of logical partitions. Each of LPAR1 135, LPAR2 140, and LPARn 145 include an instance of an OS, applications, memory, and may include other resources dedicated to the respective LPAR, which has been allocated by the hypervisor (see FIG. 2), which manages memory and processor resources for server 110. Operational activity within each of LPAR1 135, LPAR2 140, and LPARn 145 is independent of the operational activity of the other LPARs. An LPAR may also be referred to as an "image" of the operating system of the hosting CEC.

Processing units 125 include one or more processors that perform operational tasks of server 110. Processing units 125 are components of CEC 115 and some portion of processing units 125 is available to each of LPAR1 135, LPAR2 140, and LPARn 145, to perform tasks within the respective operations of the LPARs. Cache 160 is a short-term memory store that includes instructions and/or data to rapidly feed processing units 125 for task performance.

I/O interface(s) 165 includes the bus and channels that interconnect components of server 110 and connect server 110 and its components to other devices and resources though connection with network 150. Storage 155 is a persistent storage device accessible to server 110. Storage 155 is depicted as including partition monitoring program 300, and may include a plurality of applications, files and data, including an operating system for server 110 (not shown).

Partition monitoring program 300 interacts with existing interfaces and operating system debug facilities to request data, by transferring the request for data of the resources of the OS having a detected condition, to the SE. Partition monitoring program 300 uses the SE to send requests for data of the memory and/or processors of an LPAR designated by the requests. In some embodiments of the present invention, a user may invoke partition monitoring program 300, which presents a user interface for selection of a target LPAR. In some embodiments, the user may additionally select options of data to retrieve and display on the user interface. In other embodiments, partition monitoring program 300 automatically determines that a target LPAR is unresponsive, by periodically sending a query to the target LPAR through use of the target LPAR SE, for example. Determining that the target LPAR is unresponsive, by failing to receive a response to a periodic query, partition monitoring program 300 enables use of existing OS debugging channels to request data from the unresponsive LPAR, by the SE.

For example, for a z/OS®, partition monitoring program 300 uses existing interactive problem control system (IPCS) elements to initiate requests for data, but the requests for data are transferred and directed to the SE by partition monitoring program 300, using existing base control program internal interfaces (BCPi interfaces, or BCPii). The SE does not have to be on the same physical CEC to obtain the information to monitor the status of the LPAR, the SE can use a component of the operating system, referred to as BCPi interfaces, which allows the SE to communicate to remote CECs to obtain information. The BCPii's support the SE to work remotely, enabling access from an SE of a CEC for a first system, to connect to and propagate requests for data, to an SE of a CEC for a second system that has an unresponsive LPAR OS. The IPCS can communicate to its own SE, to itself, or to other support element on the network, and by translating request commands to use BCPi interfaces to access a remote SE, can query information about a detected condition of an LPAR, such as an unresponsive image. The unresponsive image may be on the same CEC or a different CEC. The requests proceed through the IPCS to BCPi interfaces, to the SE, which includes access to a mapping of the control block structure of the unresponsive LPAR, and requests to retrieve data are directed to specific memory and processing locations based on the control block structure known by the SE.

The pathway of the IPCS to the SE, to the memory of the unresponsive LPAR, is a two way path, enabling partition monitoring program 300 to perform reading and updating operations, which enables a user to view LPAR status and make updates to resolve the unresponsive state of the LPAR without having to re-initiate program load, which can prevent a loss of all work in progress and data in memory.

In other embodiments of the present invention, partition monitoring program 300 is applied to retrieve data and/or status of an image that is "responsive" (not unresponsive), but may exhibit some condition that triggers an alert or exceeds a target level, to which partition monitoring program 300 is alerted. In such cases, partition monitoring program 300 is applied to look at "healthy" images (LPARS) as well as images that are responsive but not healthy, such as images showing indications of performance degradation beyond a previously determined target level, which may be considered "unhealthy images".

Figure 2:
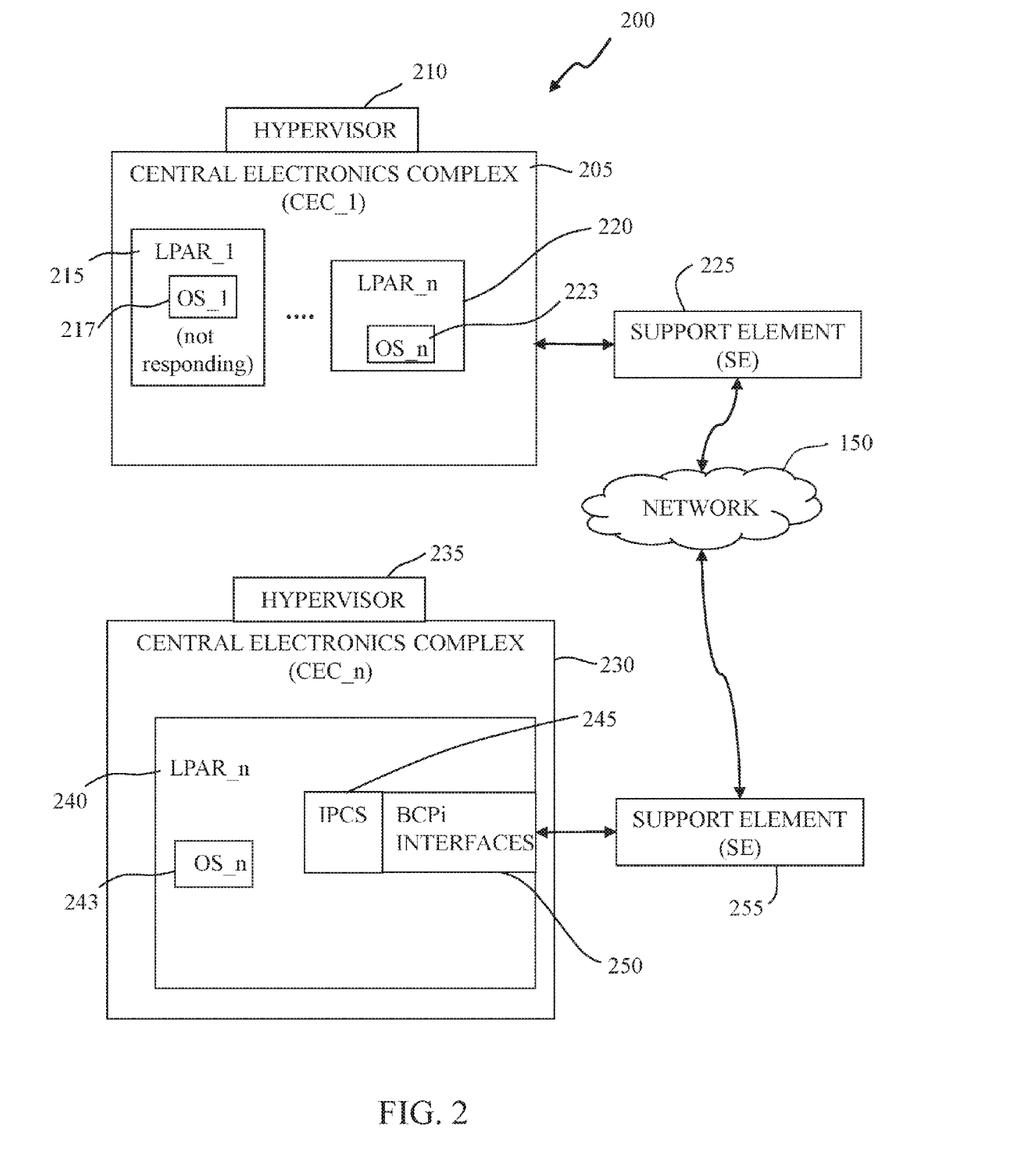
FIG. 2 is a functional block diagram illustrating remote access of an unresponsive operating system (OS) of an LPAR of a central electronics complex (CEC), from a remote system element (SE), in accordance with an embodiment of the present invention.

FIG. 2 is an exemplary block diagram illustrating remote access 200 of an unresponsive operating system (OS) of an LPAR of a central electronics complex (CEC), from a remote system element (SE), in accordance with an embodiment of the present invention. In exemplary embodiments of the present invention, remote access 200 includes CEC_1 205, hypervisor 210, and a set of logical partitions within CEC_1 205, designated as LPAR_1 215-to-LPAR_n 220. Each logical partition of the set of logical partitions includes an independent operating system, shown as operating system OS_1 217, for LPAR_1 215, which is indicated as currently unresponsive, and OS_n 223 for LPAR_n 220. CEC_1 205 is connected to SE 225, which is also connected to network 150. Hypervisor 210 manages and allocates resources of CEC_1 205 to the logical partition set LPAR1 215 to LPAR_n 220.

Remote access 200 also includes CEC_n 230, which is connected to SE 255, and whose resources are managed by hypervisor 235. CEC_n 230 is the "$n^{th}$" of a set of CEC's remote to CEC_1, and includes logical partitions, of which LPAR_n 240 is the "$n^{th}$" partition. CEC_n 230 is connected to SE 255, which is also connected to network 150, enabling a connection between SE 255 and CEC1 205. LPAR_n 240 is shown as including OS_n 243, IPCS 245, and BCPi interfaces 250.

IPCS 245 is an existing interactive problem control system, often used for running processes to communicate with other running processes, and is enabled by allocated memory in which processes can mutually store and/or retrieve data. IPCS 245 is able to obtain data from data sets, often referred to as "data dumps", which contain information about the OS or the application under test, within an LPAR, such as OS_n 243 of LPAR_n 240, operating within CEC_n 230. In current practice, data is dumped into a data set, usually because of a problem with the application or a problem experienced by the OS. An IPCS of an LPAR typically accesses data from the data set that was dumped, however, IPCS also has the capability of directly accessing memory of the CEC, and can display and modify memory locations of an LPAR. If an LPAR of a CEC is un-responsive, the IPCS for the unresponsive LPAR will not be effective in accessing the memory. Embodiments of the present invention monitor the LPARs, such as LPAR_1 215 of CEC_1 205, remotely from an independent LPAR, such as LPAR_n 240 of CEC_n 230, and partition monitoring program 300 extends IPCS to communicate with SEs, submitting requests to obtain data from the memory locations of the un-responsive LPAR. Partition monitoring program 300 modifies the IPCS such that the data retrieval and storage executed in the dump dataset modes will be replaced with remote BCPii calls to the SE BCPi interfaces to examine the same storage structures on the target LPAR as would be examined if IPCS were running on that target LPAR.

For example, in some embodiments of the present invention, IPCS 245 of LPAR_n 240 operating within CEC_n 230, which is remote to CEC_1 205, receives requests to retrieve memory status of OS_1 217, of LPAR_1 215, operating on CEC_1 205 which has been determined to be unresponsive. IPCS 245, which is enabled by partition monitoring program 300 to use BCPi interfaces 250 to connect to SE 255, transmits the requests for data retrieval to SE 255. SE 255 connects to SE 225 via network 150 and forwards the data retrieval requests to SE 225. SE 225 is an independent component of CEC_1 205 on which LPAR_1 215 operates, and includes access to information regarding the mapping of the block control structure of OS_1 217, and can thus access the memory locations and retrieve the data in memory that indicates the status of OS_1 217. In other embodiments of the present invention, an unresponsive operating system, such as OS_1 217, of LPAR_1 215 is operating within the same CEC, such as CEC_1 205, in which the IPCS (IPCS and BCPI interfaces of CEC_1 205 exist but are not shown in FIG. 2), is invoked by partition monitoring program 300 through OS_n 223 of LPAR_n 220 operating on the same CEC, CEC_1 205. The IPCS of LPAR_n 220 is invoked and connects to SE 225 by use of BCPi interfaces, and sends requests to retrieve data of OS_n 217 of LPAR_1 215.

Base control program internal interfaces (BCPii's) are used for the IPCS to connect to the SE, which is a separate computing device component of the CEC, and provide remote access to an SE of another CEC that has an unresponsive LPAR OS. The enablement of the IPCS of an LPAR of a first CEC to connect to a first SE, by use of BCPi interfaces, provides communication in two directions; allowing for retrieval, analysis, and update of data from the unresponsive LPAR of the second (remote) CEC. The OS of a responsive LPAR of the remote CEC, determines the SE of the CEC that has the unresponsive LPAR, and can send and retrieve information from the CEC that has the unresponsive LPAR. Partition monitoring program 300 enables the use of programming interfaces, such that both the operating system and the support element are aware of each other, and therefore can communicate with each other.

Because embodiments of the present invention utilize the SE and because the SE is independent of the operation of the target LPAR, retrieval, examination, and interjection of changes to the memory of the target LPAR can occur even though the LPAR OS is not capable of responding to normal consoles and commands.

Figure 3:
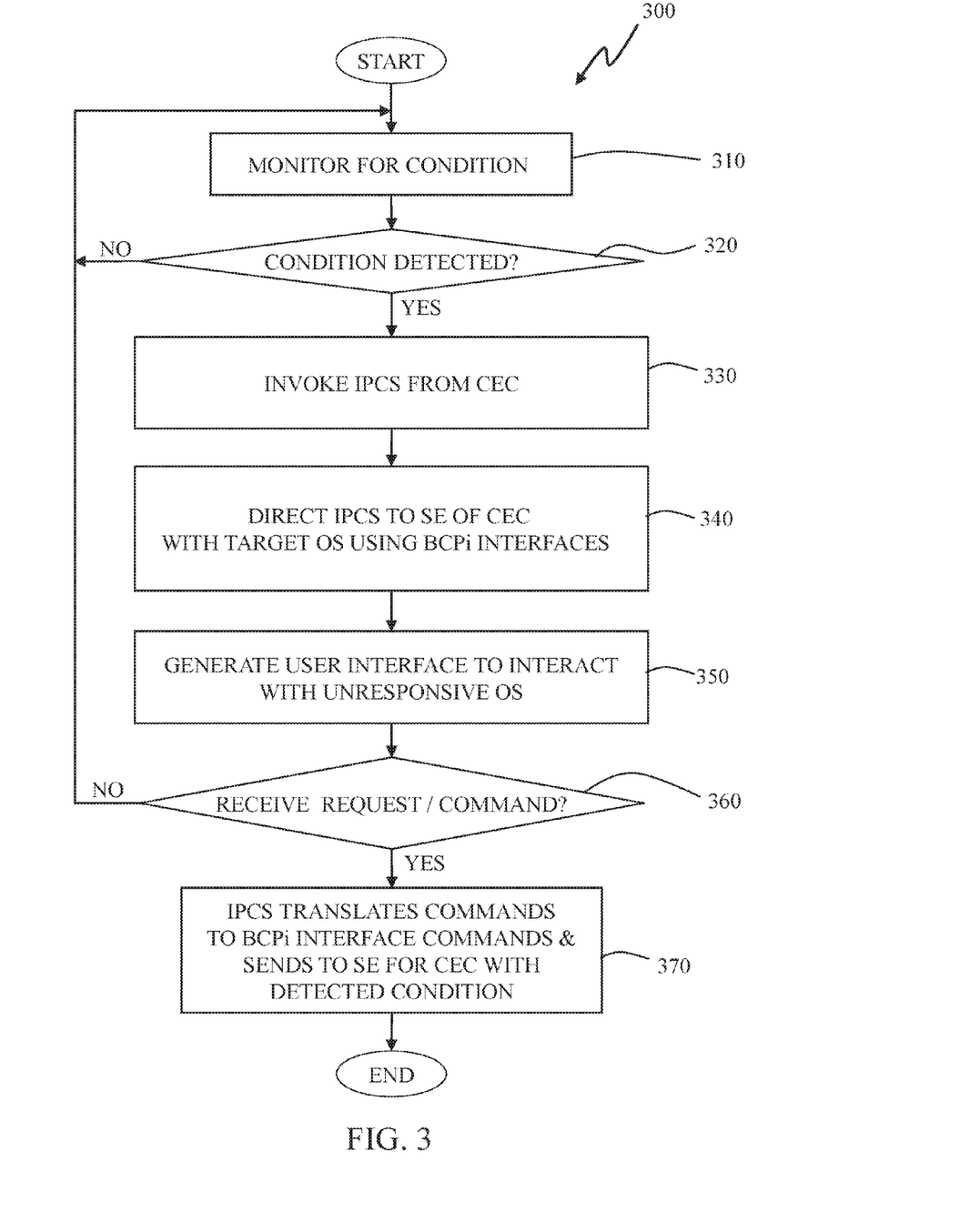
FIG. 3 illustrates operational steps of a partition monitoring program, inserted on a server computing device within the distributed computer processing environment of FIG. 1, in accordance with an embodiment of the present invention.

FIG. 3 illustrates operational steps of partition monitoring program 300, inserted on server 110 within distributed computer processing environment 100 of FIG. 1, in accordance with an embodiment of the present invention. Partition monitoring program 300 monitors LPARs of a CEC for a condition of an LPAR that exceeds a triggering level, such as an unresponsive operating system (step 310). In some embodiments of the present invention, partition monitoring program 300 continuously monitors the logical partitions of a CEC to determine whether a particular condition, such as an unresponsive operating system, occurs. In other embodiments, partition monitoring program 300 performs monitoring activity on a scheduled basis, which may be a settings parameter of partition monitoring program 300, for example. In some embodiments of the present invention, partition monitoring program 300 monitors for unresponsive conditions of logical partition operating systems, operating within a CEC, and may include monitoring for multiple CECs. In other embodiments, partition monitoring program 300 monitors for "healthy/unhealthy" indicators of responsive logical partition operating systems, which may include, but are not limited to conditions such as, degraded performance, high processor utilization over an extended time, and exceeding memory capacity warning thresholds. Each of the conditions monitored by partition monitoring program 300 may be referred to as an operational condition that surpasses a threshold, which is pre-determined.

For example, partition monitoring program 300, working with OS_n 243 of LPAR_n 240 (FIG. 2) operating on CEC_n 230, monitors the set of LPARs operating within the control and resources of CEC_1 205, by a connection between SE 255 of CEC_n 230, and SE 225 of CEC_1 205, via network 150. SE 225 has access to the program status and memory block control structure of the LPARs operating within CEC_1 205. The IPCS of LPAR_n 240 is invoked and connects to SE 255 by use of BCPi interfaces (not shown), and sends requests to SE 225 via network 150 to retrieve data from OS_n 217 of LPAR_1 215. In some embodiments of the present invention, SE 225 returns data and information regarding conditions of LPARs operating within CEC_1 205 to partition monitoring program 300, via network 150 and SE 255, which can be used to determine if unresponsive or other heath conditions of one or more LPARs exists. In other embodiments, the occurrence of certain conditions within an LPAR operating within CEC_1 205 may trigger warnings or alert messages viewable by a system administrator user on a console display connected to the system that includes the alert-generating LPAR, such as unresponsive OS_1 217, of LPAR_1 215. The above exemplary implementation includes discussed components including BCPii and IPCS which are components of a zOS® operating system, and include use of an existing SE, and the SE's application programming interfaces (APIs). One of ordinary skill in the art will note that embodiments of the present invention include enhancements to the SE interfaces and BCPii.

Partition monitoring program 300 determines whether monitored conditions of a CEC have been detected (decision step 320), and in response to determining that the monitored condition(s) have not been detected, (step 320, "NO" branch), partition monitoring program 300 continues to monitor one or more logical partitions of one or more CECs for detection of triggering condition(s) (return to step 310). For the case in which partition monitoring program 300 determines that a triggering condition has been detected, (step 320, "YES" branch), partition monitoring program 300 invokes IPCS from a CEC that is connected to the operating system of the LPAR exhibiting the triggering condition (step 330).

For example, partition monitoring program 300 receives a notice of monitored conditions, such as the unresponsiveness of OS_1 217 of LPAR_1 215 operating within CEC_1 205. The monitoring may include conditions that reflect the state of the target system and in some embodiments, partition monitoring program 300 periodically queries the state of the LPAR targeted for monitoring. Partition monitoring program 300 invokes IPCS 245 of LPAR_n 240, from CEC_n 230 which includes SE 255 that can access SE 225 via network 150. SE 225 is a component of CEC_1 205, within which the target OS is operating, but unresponsive, and SE 225 can access memory locations associated with OS_1 217. In other embodiments, the IPCS of LPAR_n 220 is invoked, which can access interfaces of SE 225, which has access to memory of unresponsive OS_1 217 of LPAR_1 215.

Having invoked IPCS, partition monitoring program 300 directs an IPCS connection to the SE of the CEC that includes the LPAR OS exhibiting the triggering conditions (step 340), also referred to as the "target LPAR", which includes the "target OS". To establish a connection for communication to and from the SE of the CEC that includes the target LPAR OS, the IPCS are additionally configured to access the base control program internal (BCPi) interfaces to establish a connection with the SE (because of the one-to-one nature of SE to CEC, the CEC in which the target LPAR operates can also be referred to as the "target CEC"). In some embodiments of the present invention, BCPii, or equivalent interfaces, exist in operating systems, such as zOS®, and zVM®, and may exist in other OSs, and the IPCS of monitoring LPAR is modified by partition monitoring program 300 to make use of the existing BCPi interfaces (or their equivalents). The connection of the IPCS to the SE of the CEC in which an LPAR and OS exhibit triggering conditions, is enabled by use of the BCPi interfaces, which allows remote CEC connection to the target LPAR by the SE. Use of BCPi interfaces by partition monitoring program 300 modifying the IPCS, enables an SE to remotely access the OS memory and status information of the LPAR that exhibits triggering conditions, and embodiments in which the connection to the SE is from a responsive LPAR within the same CEC as the OS of the target LPAR.

For example, having detected that OS_1 217 of LPAR_1 operating within CEC_1 205 is unresponsive, partition monitoring program directs a connection of IPCS 245, using BCPi interfaces 250, to SE 225. The connection includes IPCS 245 connecting to SE 255, using BCPi interfaces 250, to connect to SE 225. SE 225 is an independent component of CEC_1 205 and can access partitioned memory of CEC_1 205. Partition monitoring program 300 directs the connection to memory allocated to OS_1 217 of LPAR_1 215 operating within CEC_1 205.

Having established connection to the SE of the target LPAR OS of the target CEC, partition monitoring program 300 generates a user interface to interact with the target OS (step 350). In some embodiments of the present invention, the user interface generated by partition monitoring program 300 includes a format and appearance of the operating system console for a system programmer or system administrate to interact. Including a familiar format for the generated user interface facilitates the effectiveness and efficiency of a system programmer diagnosing and correcting detected system problems. In other embodiments, partition monitoring program 300 generates a display of data and information requested and offers an input field for directing commands to the target LPAR OS. In some embodiments, the user interface is generated only after receiving particular command input from a user, such as a system programmer or system administrator.

For example, in some embodiments of the present invention, a system programmer invokes partition monitoring program 300 which initializes IPCS 245 of LPAR_n 240 operating on CEC_1 230, to establish a connection with SE 225 by using BCPi interfaces 250 to SE 255, which connects to SE 225 via network 150. SE 225 receives from the system programmer, information that identifies the target CEC and LPAR names to target OS_1 217 of LPAR_1 215. Establishing the connection, IPCS 245 opens a communication link using BCPi interfaces 250, between OS_1 217 and the user interface, through a connection between SE 255 and SE 223.

In other embodiments, upon detection of a triggering condition, partition monitoring program 300 initializes the IPCS of a separate CEC that is network-connected to the target CEC, which includes the target OS having the triggered condition. The initialized IPCS establishes the connections described by example above, based on the detected information of the triggering condition of the target OS, without input of a user, such as a system programmer. The IPCS of the remote CEC opens a communication link with the SE of the target CEC.

Having generated a user interface to interact with the target LPAR OS, partition monitoring program 300 determines if commands have been received (decision step 360). In some embodiments of the present invention, if partition monitoring program 300 receives no command input, within a pre-determined period of time (step 360, "NO" branch), partition monitoring program 300 takes no further action, and returns to step 310, and continues monitoring for triggering conditions. In some embodiments the displayed user interface is removed, and may be replaced with a displayed notification that no command has been received in response to a detected condition, within an allotted time. In other embodiments, the user interface and information identifying the target OS, LPAR, and CEC is displayed on the user interface screen. In yet other embodiments of the present invention, partition monitoring program 300 may continue to display the user interface and information identifying the target OS, LPAR, and CEC, until a user acknowledges the display, and upon receiving acknowledgement that does not include additional commands, returns to step 310 and continues to monitor for triggering conditions.

For the case in which partition monitoring program 300 receives one or more requests and/or commands (step 360, "YES" branch), partition monitoring program 300 directs IPCS to translate the received commands to BCPi interface commands (step 370). Requests and/or commands, which are received by IPCS and then translated to BCPi interface commands, enable the command to be received by the SE of the target CEC in which the target OS operates. In some embodiments of the present invention, commands submitted by a user, such as a system programmer, may include, but are not limited to, retrieval of data associated with the target OS status and memory, specific information of applications running in the target LPAR, and corrective or diagnostic actions to mitigate the detected conditions. The SE of the target CEC performs the commands and, as appropriate, returns data and/or information to IPCS which, as directed by partition monitoring program 300, translates and displays the data and/or information in a user interface that in some embodiments includes features familiar to users of other system console displays.

For example, in some embodiments of the present invention partition monitoring program 300 detects OS_1 217 of LPAR_1 215, operating within CEC_1 205, as being unresponsive, identifying LPAR_1 215 as a target image. Partition monitoring program 300 initiates IPCS 245 of LPAR_n 240, operating in CEC_n 230, which has access to SE 225 via SE 255 and network 150. SE 225 includes access to a mapping of the control block structures of the address space of CEC_1 205. Partition monitoring program 300 generates a user interface and in some embodiments, directs IPCS 245 to build a BCPi interface request to retrieve data from the target image, stored in buffers in the address space of CEC_1 205. The requests for data are sent using BCPi interface 250 to SE 255 which connects to SE 225 via network 150, and retrieves the data and builds output in the generated user interface display, for examination by a system programmer, and potential follow-up actions. In some embodiments of the present invention, the target system may still be running and putting data into the buffers of the address space of CEC_1 205, and partition monitoring program 300 will periodically direct the IPCS to perform additional retrieve requests to the address space of the target operating system, OS_1 217, to retrieve the most current state of the buffers and display them for the system programmer.

In other exemplary embodiments. The system programmer observes an alert indicating that OS_1 217 of LPAR_1 215 is unresponsive. The system programmer launches partition monitoring program 300 and initiates IPCS 245 to build BCPi interface requests to retrieve data, and identifies the target image whose data is to be retrieved. The requests are translated to use BCPi interface 250, connecting to SE 255 and remotely accessing data from CEC_1 205 for the target image, by connection to SE 225 via network 150. The data is retrieved, passing back through SE 225, network 150, to BCPi interfaces 250 of SE 255, to IPCS 245, and displayed for the system programmer (in some embodiments, displayed in a generic screen, in other embodiments, the data is displayed in a user interface with familiar features, generated by partition monitoring program 300). The system programmer examines the data and may input additional commands to IPCS to resolve the unresponsive condition of the target operating system OS_1 217. Having examined and addressed the unresponsive condition, the system programmer ends partition monitoring program 300.

Figure 4:
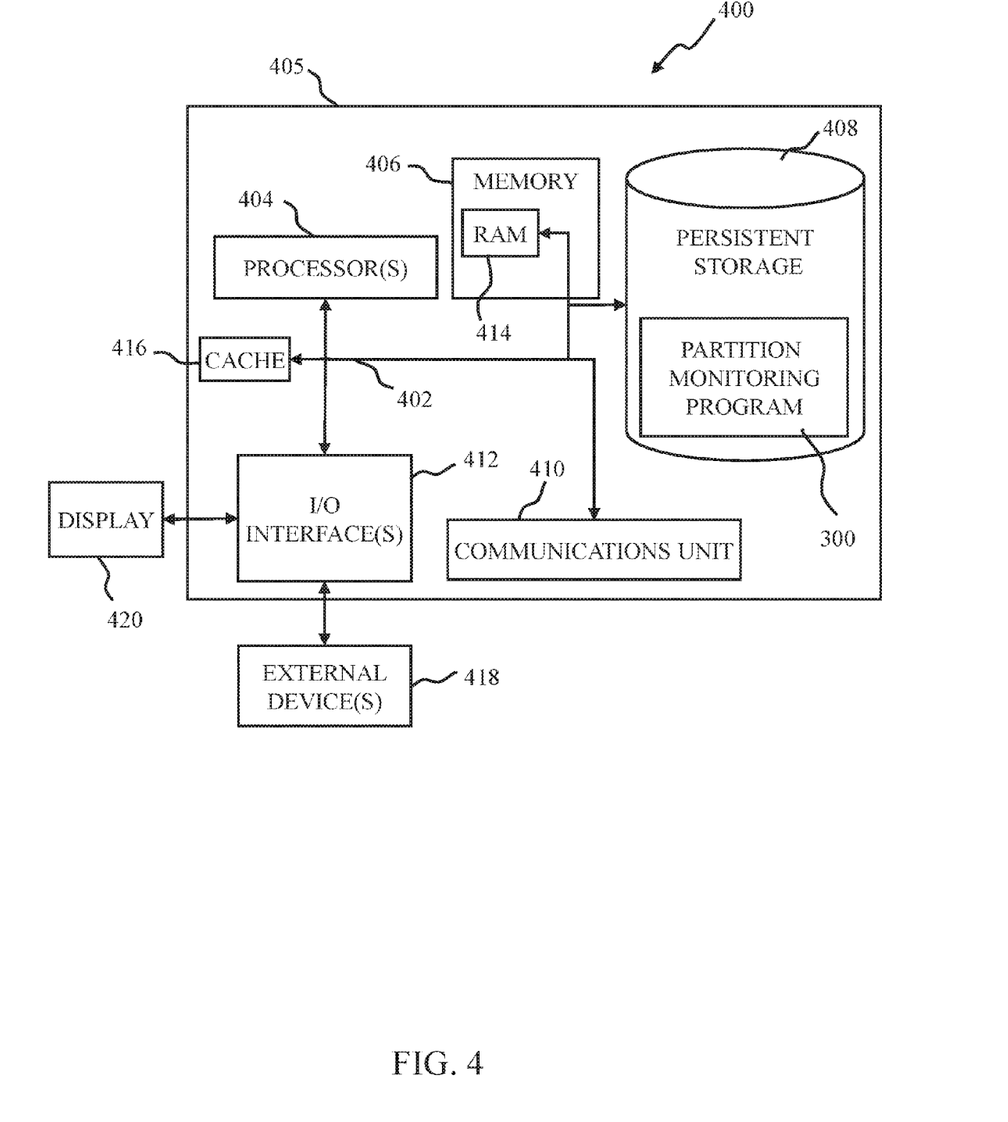
FIG. 4 depicts a block diagram of a computing system, including components of a computing device capable of operationally performing the partition monitoring program, in accordance with an embodiment of the present invention.

FIG. 4 depicts a block diagram of a computing system 400, including components of computing device 405 capable of operationally performing partition monitoring program 300, in accordance with an embodiment of the present invention.

Computing device 405, includes components and functional capability similar to server 110 and server 170, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media devices. In this embodiment, memory 406 includes random access memory (RAM) 414. In general, memory 406 can include any suitable volatile or non-volatile computer readable storage media.

Partition monitoring program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed computer processing environment 100, server 110, server_n 170, and support elements 120 and 180. In these examples, communications unit 410 includes one or more network interface cards. Communications unit 410 may provide communications through the use of either or both physical and wireless communications links. Partition monitoring program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., partition monitoring program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for investigating an operational condition of a logical partition of a computing system by a separate logical partition, the computer system comprising:
   one or more computer processors;
   one or more computer readable storage media; and
   program instructions stored on the computer readable storage media for execution by at least one of the one or more processors, the program instructions comprising:
   one or more computing systems, each of the one or more computing systems including a central electronics complex capable of concurrently operating multiple logical partitions, each central electronics complex including a support element that includes an operating system independent of operating systems of the multiple logical partitions, and wherein each support element has access to memory locations of the multiple logical partitions operating within memory of a corresponding central electronics complex, and has access to a mapping of the memory locations for the multiple logical partitions of the corresponding central electronics complex, comprising:
      program instructions to detect an operational condition surpassing a threshold indicating an unresponsive operating system, or a declining performance of a logical partition of the multiple logical partitions of a first central electronics complex, wherein the operational conditions of the multiple logical partitions of the first central electronics complex are monitored;
      program instructions to request a retrieval of data that includes an operational status from the memory locations of the logical partition of the multiple logical partitions of the first central electronics complex, of a first computing system of the one or more computing systems, in which an operational condition surpassing a threshold is detected;
      program instructions to modify existing operating system diagnostic channel elements of a monitoring logical partition to enable an interface of the support element of the first central electronics complex to send instructions, and receive data, wherein a modification of the existing operating system diagnostic channel elements of a monitoring logical partition enables the support element of the first central electronics complex to remotely access the logical partition of the multiple logical partitions, in which the operational condition surpassing a threshold is detected;
      program instructions to generate a user interface that includes a display of the data requested for retrieval, which includes the operational status from the memory location of the logical partition of the multiple logical partitions in which the operational condition surpassing a threshold is detected; and
      in response to receiving the data that includes the operational status from the memory locations of the logical partition of the multiple logical partitions in which the operational condition surpassing a threshold, is detected, program instructions to display on the user interface the data that is retrieved, which includes the operational status from the memory location of the logical partition of the multiple logical partitions in which the operational condition surpassing a threshold is detected,
   wherein each of an operating system of the first central electronics complex that is monitoring the multiple logical partitions, and an operating system of a target logical partition having operational conditions surpassing a threshold is a zOS® operating system.

* * * * *